(12) United States Patent
Reichenbach et al.

(10) Patent No.: US 8,963,777 B2
(45) Date of Patent: Feb. 24, 2015

(54) METHOD AND NODE FOR LOCALIZING A NODE IN A WIRELESS NETWORK

(71) Applicants: Frank Reichenbach, Slependen (NO); Pal Orten, Asker (NO)

(72) Inventors: Frank Reichenbach, Slependen (NO); Pal Orten, Asker (NO)

(73) Assignee: ABB AS (NO)

( * ) Notice: Subject to any disclaimer, the term of this patent is extended or adjusted under 35 U.S.C. 154(b) by 0 days.

(21) Appl. No.: 14/148,185

(22) Filed: Jan. 6, 2014

(65) Prior Publication Data

US 2014/0118193 A1 May 1, 2014

Related U.S. Application Data

(63) Continuation of application No. PCT/EP2011/061186, filed on Jul. 4, 2011.

(51) Int. Cl.

| G01S 3/02 | (2006.01) |
| G01S 5/10 | (2006.01) |
| G01S 5/02 | (2010.01) |
| G01S 11/06 | (2006.01) |
| G01S 11/14 | (2006.01) |
| H04B 17/00 | (2006.01) |

(52) U.S. Cl.
CPC ............. *G01S 5/10* (2013.01); *G01S 5/0226* (2013.01); *G01S 5/0236* (2013.01); *G01S 5/0289* (2013.01); *G01S 11/06* (2013.01); *G01S 11/14* (2013.01); *H04B 17/0057* (2013.01); *H04B 17/007* (2013.01); *H04B 17/0072* (2013.01)
USPC ........................................................ 342/464

(58) Field of Classification Search
USPC ........................... 342/464, 458, 455
See application file for complete search history.

(56) References Cited

U.S. PATENT DOCUMENTS

| 7,812,718 | B1 | 10/2010 | Chan et al. | |
| 2004/0229621 | A1 | 11/2004 | Misra | |
| 2007/0201421 | A1* | 8/2007 | Huseth | 370/338 |
| 2008/0298387 | A1* | 12/2008 | Lohr et al. | 370/467 |
| 2010/0085242 | A1 | 4/2010 | Kim et al. | |
| 2010/0246438 | A1 | 9/2010 | Potkonjak | |
| 2011/0105142 | A1 | 5/2011 | Sawai | |
| 2012/0320760 | A1* | 12/2012 | Kim et al. | 370/242 |

FOREIGN PATENT DOCUMENTS

| EP | 0936752 A1 | 8/1999 |
| WO | 2011040346 A1 | 4/2011 |

OTHER PUBLICATIONS

International Preliminary Report on Patentability Application No. PCT/EP2011/061186 Completed: Nov. 26, 2013 18 pages.

(Continued)

*Primary Examiner* — Harry Liu

(74) *Attorney, Agent, or Firm* — St. Onge Steward Johnston & Reens LLC

(57) ABSTRACT

A method for localizing a node in a wireless network, the method including: receiving location signals transmitted by beacons, the location signals including information about the locations of the respective beacons; detecting the respective received signal strengths of the received location signals; obtaining information about the different signal levels at which the beacons can transmit; studying the received location signals; determining the signal levels used by each of the beacons for the transmission of the location signals, based on the studying of the received signals; calculating a distance to each of the beacons based on the detected signal strengths and the determined signal levels; and localizing the node by means of the received location information and the calculated distances. The invention also relates to a node ant to a wireless network.

17 Claims, 2 Drawing Sheets

(56) References Cited

OTHER PUBLICATIONS

International Search Report and Written Opinion of the International Searching Authority Application No. PCT/EP2011/061186 Completed: Feb. 27, 2012; Mailing Date: Mar. 6, 2012 13 pages.

Kaplan E; "Understanding GPS: principles and applications, passages"; pp. 314-319,343-346; 1996.

Written Opinion of the International Preliminary Examining Authority Application No. PCT/EP2011/061186 Mailing Date: Jun. 12, 2013 5 pages.

* cited by examiner

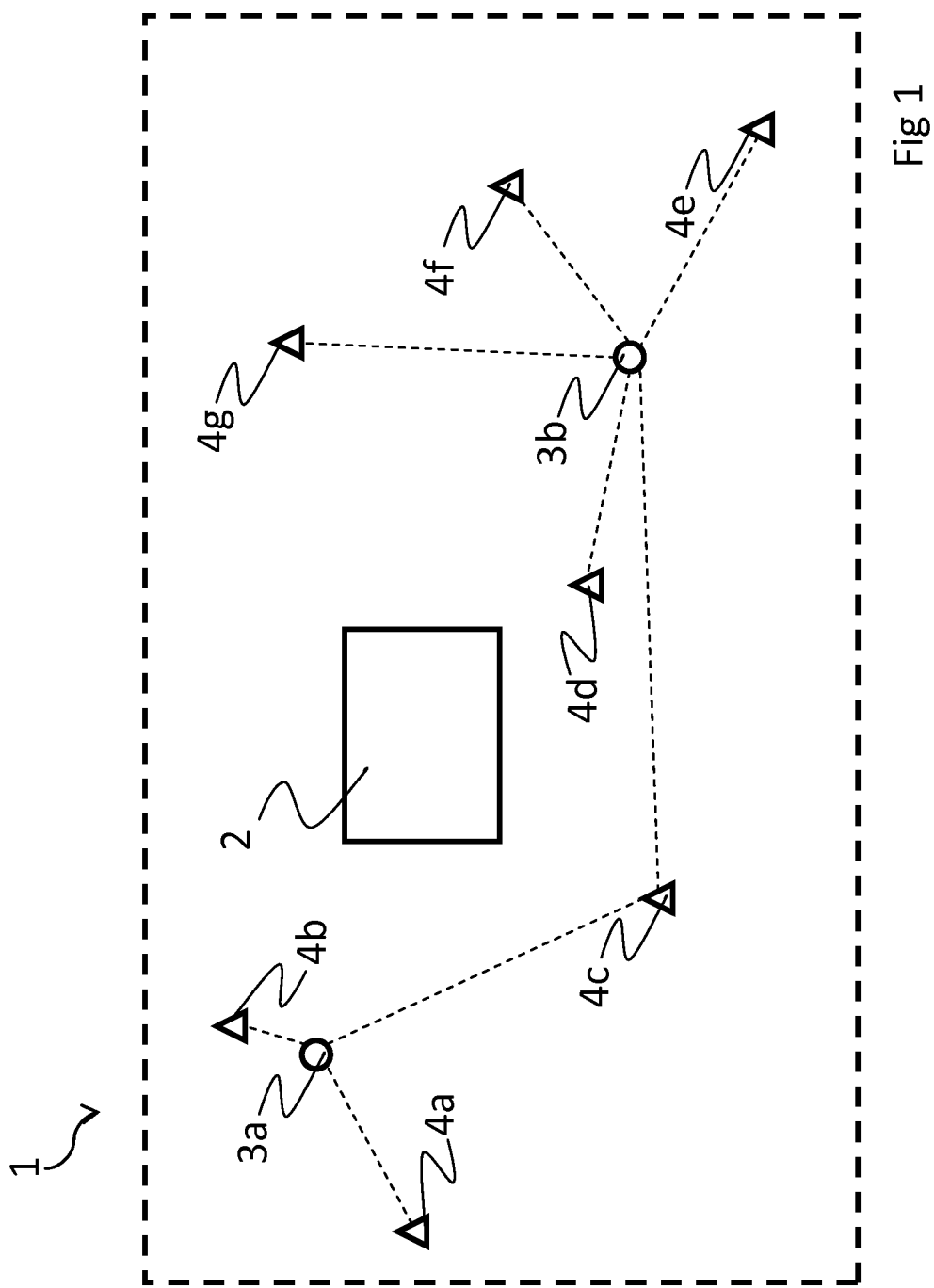

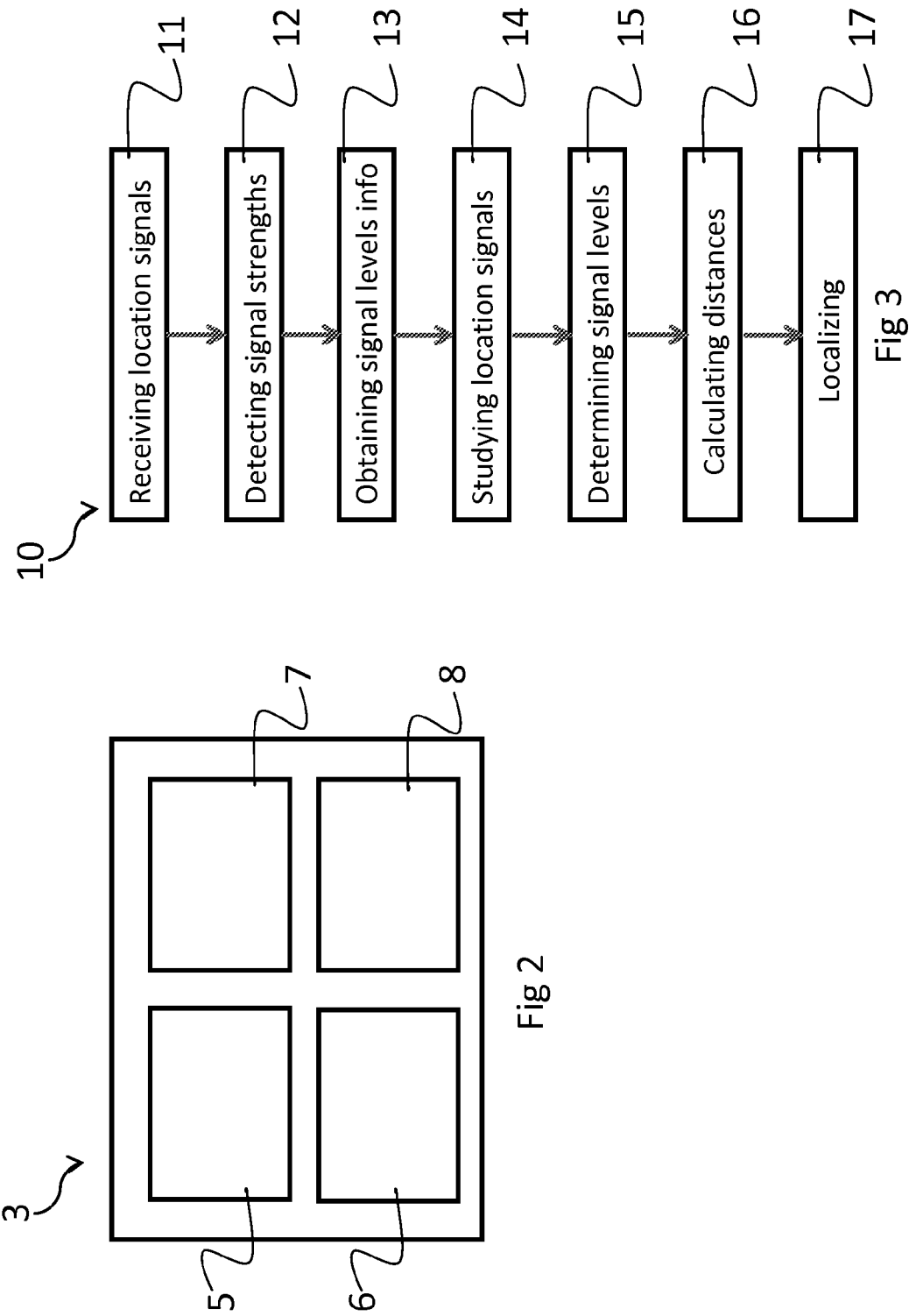

METHOD AND NODE FOR LOCALIZING A NODE IN A WIRELESS NETWORK

FIELD OF THE INVENTION

The invention relates to a method of a node to localize the node in a wireless network of an industrial plant, as well as to a node and a wireless network.

BACKGROUND OF THE INVENTION

In an industrial plant, movable wireless sensors may be used. It may be desirable to be able to locate these sensors within the plant. For this, stationary beacons of known position can be used. The location of the sensor may then be calculated e.g. via triangulation or by estimating the distance between each of the beacons and the sensor by measuring the attenuation of each of the beacon signals when it reaches the sensor. The weaker the signal, the further away is the beacon.

Wireless sensor networks are disclosed in the patent publications WO 2011/040346, U.S. Pat. No. 7,812,718 and US 2010/085242.

US 2011/0105142 discloses, as a prior art therein, a method where a wireless communication device estimates the location of itself based on triangulation by using reception strength of a beacon regularly transmitted from a base station and location information of the base station included in the beacon. According to this method, the wireless communication device has to receive beacons from at least three base stations.

SUMMARY OF THE INVENTION

In accordance with one aspect, the present invention relates to a method of a node to localize the node in a wireless network of an industrial plant, the method comprising: receiving location signals transmitted by each of at least three beacons, the location signals comprising information about the locations of the respective beacons, wherein the location signals are transmitted by the beacons using dynamic transmission power whereby the beacons can transmit the location signals at a plurality of different predetermined sending signal levels; detecting the respective received signal strengths of the received location signals; obtaining information about the different signal levels at which the beacons can transmit; studying the received location signals; determining the signal levels used by each of the beacons for the transmission of the location signals, based on the studying of the received signals; calculating a distance to each of the beacons based on the detected signal strengths and the determined signal levels; and localizing the node by means of the received location information and the calculated distances.

In accordance with another aspect, the present invention relates to a node for a wireless network, the node comprising: a receiver adapted to receive location signals transmitted by each of at least three beacons, the location signals comprising information about the locations of the respective beacons, wherein the location signals are transmitted by the beacons using dynamic transmission power whereby the beacons can transmit the location signals at a plurality of different predetermined signal levels; a detector adapted to detect the respective received signal strengths of the received location signals; a storage unit adapted to store information about the different signal levels at which the beacons can transmit; and a processing unit adapted to study the received location signals, determine the signal levels used by each of the beacons for the transmission of the location signals, based on the study of the received signals, calculate a distance to each of the beacons based on the detected signal strengths and the determined signal levels, and localize the node by means of the received location information and the calculated distances.

In accordance with another aspect, the present invention relates to a wireless network of an industrial plant, the network comprising: a node according to the above aspect; at least three beacons adapted to wirelessly transmit the location signals to the node; and a central control unit adapted for wireless communication with both the node and the beacons.

Discussions above and below relating to any of the above aspects of the present invention are also in applicable parts relevant to any of the other aspects.

By determining the signal level, such as the power level or amplitude level, at which each of the beacons is transmitting the location information, the node may localize itself even when the beacons are using a dynamic power protocol for their transmissions, e.g. adaptive power adjustment (APA). In accordance with the present invention, the transmission signal levels used by the beacons may be determined based on studying of the received location signals in combination with obtained information about at which signal levels each beacon can transmit, e.g. information about the dynamic power protocol used.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 1 is a schematic top view of a wireless network according to an embodiment of the present invention.

FIG. 2 is a schematic diagram of a node according to an embodiment of the present invention.

FIG. 3 is a schematic flow chart of a method according to an embodiment of the present invention.

DETAILED DESCRIPTION OF THE INVENTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

The network may be any wireless network, such as a wireless sensor network, comprising a node, such as a sensor node and beacons. The network may e.g. be a local area network (LAN), using e.g. Bluetooth, WirelessHART, WiFi and/or Zigbee. The network may comprise a central control unit, but networks without a central control unit are also contemplated.

The term "industrial plant" is intended to be interpreted in a broad sense, comprising any large facility where it may be desirable to locate a node within said facility.

The node may be any type of node, such as a sensor node. In the following the node is exemplified as a sensor node but it should be noted that also other nodes of a wireless network may be used. Typically, the node is movable, thus increasing the need to localize it. It may e.g. be mounted on a truck or a human person, or any other object moving around in the plant. A sensor node may e.g. include a sensing unit (a.k.a. a sensor) a processing unit, such as a low power processor, a storage unit, such as a memory, and a wireless communication module. The node may measure conditions of the environment, pre-calculate, aggregate, and transmit data to a base station or central control unit. Hundreds such nodes may form a large wireless network to monitor large plants.

The sensor node may comprise a sensor, e.g. comprise a sensor for measuring radiation or the occurrence of a potentially dangerous gas, or a motion sensor. The sensor node might comprise an alarm function, e.g. warning a person in its vicinity that radiation or gas levels are too high, or alerting the central control unit or other person that a person to which the sensor is mounted has stopped moving. However, other types of sensors are also contemplated. Typically, a plurality of sensor nodes is within the plant, and may need to be localized.

The beacons (also known as anchor nodes or anchors) may be any beacons distributed around the plant and capable of sending their respective locations to the sensor node. A beacon may be a node only used as a beacon for localization of the sensor node, or it may be any node, such as a sensor node, within the wireless network which is also used as a beacon. Typically, the beacon is stationary, but it may alternatively be movable. It may be convenient if the beacon is essentially stationary while it is used to localize the sensor node. The beacon is configured to transmit information about its location via location signals to the sensor node to be localized. This transmission may be done continuously, periodically, in accordance with a pre-set schedule, or upon request from e.g. the sensor node or a central control unit. The beacon may know its own location, e.g. by an operator determining and storing the location to it directly, typically used if the beacon is stationary, or by including a GPS unit, or the like, typically if the beacon is movable. In order to sufficiently localize the sensor node, at least three beacons are preferably used which are all within range of the sensor node such that the location signals comprising the location information transmitted by each of the beacons may be received by the sensor node. However, it may be convenient to use more than three beacons, such as four or five beacons, or up to ten or twenty beacons. More beacons in range of the sensor node may imply a more precise localization of the sensor node. If the sensor node should be localized in three dimensions, e.g. with respect to its altitude in addition to being localized in a horizontal plane, it may be convenient to use at least four beacons, preferably with at least two of said beacons located at different altitudes.

The location signals include location information, i.e. information about the location/position of the beacon which sent the location signals. The location signals may be general communication signals. The location information may e.g. include X and Y coordinates giving the position of the beacon in a plane of the industrial plant. The plane may e.g. be a floor of the plant. It may be desirable to localize the sensor node in three dimensions, in which case the location information may e.g. also include a Z coordinate, e.g. giving the altitude above the plant floor. The coordinates may be of a local coordinate system of the plant, or they may be of a global positioning system. The location information may, additionally or alternatively, include other location information than coordinates, e.g. information as to in which part of the plant the beacon is located or where it is located in respect of (e.g. distance from) a specific position in the plant, or any other information that may allow the sensor node to draw conclusions about the location of the beacon.

At least one, conveniently all, of the beacons uses dynamic transmission power when transmitting the location signals. This implies that the transmission power used may change over time when transmitting the location signals. The beacon may thus transmit at different signal levels, such as different power levels, consecutively, but typically not transmit at different signal levels at the same time. Typically, the beacon may transmit at a signal level which is less than its maximum signal level, in order to save energy, reduce interference with other transmissions, reduce the ware of the beacon transmitter etc. If the sensor node, or any other receiver of the signals transmitted by the beacon, does not receive the transmission clear enough, it may inform the beacon of this, e.g. by requesting the signals to be re-sent by sending a negative acknowledgement, NACK, to the beacon. The beacon may then choose to increase the signal level of the transmission of the signals. Typically, the beacon has a number of different pre-determined signal levels which it may use for its transmissions, and when it receives a NACK for a transmission it may re-send that transmission using the next higher signal level. Additional NACKs may lead to further increased signal levels until the maximum transmission power is used by the beacon. One protocol with dynamic transmission power which may be used with the present invention is the Adaptive Power Adjustment (APA) protocol.

The sensor node comprises a detector for detecting the signal strength of each of the location signals from each of the beacons. The received signal strength may be detected as the real received signal strength (RSS) or e.g. as a received signal strength indication (RSSI). The received signal strength depends on the power used for the transmission of the signal by the beacon, and on the attenuation of the transmitted signals. The attenuation may depend on the distance between the sensor node and the beacon, but also on obstacles, reflexions, interferences etc. there between. Thus, the attenuation may give an indication of the distance between the sensor node and the beacon, but it may also be convenient to consider the effect of other factors on the attenuation. When calculating the estimated distance between the sensor node and the beacons, it may thus be convenient to account for the general propagation and attenuation environment of the plant.

The sensor node obtains information about the different signal levels at which each of the beacons can transmit. As mentioned above, at least one of the beacons uses dynamic transmission power. The information may be information that allows the sensor node to draw conclusions about which pre-set signal levels the beacon can use. This information may then be used to determine at which power the beacon transmits the location signals. The other beacons may use fixed transmission power, or also they may use dynamic transmission power, with the same or different signal levels as the at least one beacon. Also information about the transmission power of any beacons using fixed transmission power may be obtained by the sensor node. The signal level information may be obtained by the sensor node by e.g. the respective beacons or a central control unit transmitting it to the sensor node, or empirically by following the received signal strength over time.

The received location signals are studied by the sensor node in order to determine at which of the (dynamic) signal levels the beacons transmit the respective location signals. The studying may comprise finding information about which signal level was used in the location signal itself. The beacon may e.g. include information about the transmission power used, in the packet header of the location signals. Thus, the location signals may further comprise power information about which of the signal levels is used by each of the beacons for transmission of said location signals, and wherein the studying of the location signals comprises obtaining said power information.

Alternatively or additionally, the studying of received location signals may comprise monitoring the location signals over time during which time each beacon using dynamic transmission power transmits at a plurality of its signal levels, such that conclusions can be drawn about which of the signal levels of each of the beacons corresponds to which received signal strength. When using dynamic transmission power, such as APA, the beacon may transmit at different signal levels depending on the transmission and reception conditions. The sensor node monitoring this may eventually have seen all, or at least a large part of the transmission signal levels available to the beacon, whereby the sensor node may with sufficient accuracy associate a specific received signal strength with one of the transmission signal levels. Conveniently, one of the transmission signal levels seen by the sensor node is the maximum transmission power of the beacon, allowing the sensor node to with high certainty associate this received signal strength with the maximum transmission power of the beacon, as obtained as discussed above.

Instead of only passively studying the signal strengths of the location signals, the sensor node may actively prompt the at least one beacon to transmit at different signal levels, e.g. by sending negative acknowledgements as discussed above, preferably until the beacon has reached its maximum transmission power allowing the sensor node to with high certainty associate this received signal strength with the maximum transmission power of the beacon, as obtained as discussed above. Thus, the inventive method may include sending a negative acknowledgement, NACK, to the at least one beacon in response to receiving the location signals, thereby prompting the beacon to transmit at the plurality of signal levels. Preferably, NACKs are sent in response to received location signals until location signals from the at least one beacon have been sent at a maximum signal level.

Based on the detected received signal strength of the location signals from each of the beacons and the respective determined transmission power of the beacons, the estimated distance from the sensor node to each of the beacons may be calculated. The estimated distance between the sensor node and one of the beacons may be calculated by comparing the received signal strength of the location signals with the transmission power used for sending the signals. As mentioned above, the special attenuation conditions of the plant may also be taken into consideration when estimating the distances. In short, the degree of attenuation of the signals corresponds to the distance between the beacon sending the signals and the sensor node receiving the signals.

Having estimated the distances to the beacons, the sensor node may localize itself, since the respective positions of the beacons are known as well as the distance to each of them. However, since there are sources of error present, e.g. the interference of the signals between a beacon and the sensor node, no one exact point satisfying the equation formed by the above conditions may be found. Instead, no points or a plurality of points may be found. The different beacon positions may thus be weighted, e.g. such that the closest beacon (according to the estimated distances) is given the highest weight for its location information, such as coordinates, when localizing the sensor node. The remaining beacons may also be weighted in order of closeness to the sensor node, such that the location information of the beacon estimated to be the furthest away from the sensor node is given the lowest weight. An example of weighted localization calculation in a two-dimensional system is given by Equation 1 below.

$$P_i(x, y) = \frac{\sum_{j=1}^{n} (w_{ij} \times B_j(x, y))}{\sum_{j=1}^{n} w_{ij}} \quad \text{Equation 1}$$

$P_i(x, y)$ is the position, x and y coordinates, of sensor node i, $B_j(x, y)$ is the position, x and y coordinates, of the beacon j, $w_{ij}$ is the weight of the distance between the sensor node i and the beacon j, and n is the number of beacons used for the localization, i.e. the number of beacons in range of the sensor node.

The weight ($w_{ij}$) may have a direct relation to the estimated distance ($d_{ij}$) between the sensor node i and the beacon j, e.g. $w_{ij}$ may be $1/d_{ij}$. Thus, the localizing of the present invention may comprise weighing the location information received from each of the beacons in accordance with the respective calculated distances to said beacons.

Specific embodiments of the present invention will now be discussed with reference to the figures.

With reference to FIG. 1, a wireless network 1 comprises a central control unit or base station 2 and a plurality of nodes 3 and beacons 4. The central control unit 2 is able to wirelessly communicate with and control both the nodes 3 and the beacons 4. For simplicity, only two nodes 3a-b are shown in the figure, but the wireless network 1 may include many more nodes 3, such as over one hundred nodes 3. Typically the wireless network 1 may comprise many more nodes 3 than beacons 4.

Node 3a has three beacons 4a-c within communication range (as indicated by the dashed lines in FIG. 1), by means of which it may localize itself in accordance with the present invention.

Node 3b has five beacons 4c-g within communication range (as indicated by the dashed lines in FIG. 1), by means of which it may localize itself in accordance with the present invention. It may be advantageous for increased precision in localization, for a node 3 to have as many beacons 4 as possible within range. Node 3b may thus be more precisely localized than node 3a. However, also other factors may affect localization precision. It is noted that beacon 4c has both nodes 3a and 3b within its range.

It is envisioned that once a node 3 has localized itself, it may function as a beacon 4 for other nodes 3.

Turning now to FIG. 2, a node 3 may comprise a receiver 5, a detector 6, a storage unit 7 and a processing unit 8. The receiver 5 is adapted to receive the location signals transmitted by each of the at least three beacons 4 (FIG. 1). The detector 6 is adapted to detect the received signal strengths of the location signals transmitted by the beacons 4. The storage unit 7 is adapted to store information about the different signal levels at which the beacons 4 can transmit. The processing unit 8 is adapted to process the information received, detected and stored by the receiver 5, the detector 6 and the storage unit 7, to localize the node 3. Thus, the processing unit 8 is adapted to study the received location signals, determine the signal levels used by each of the beacons 4 for the transmission of the location signals, based on the study of the received signals, calculate a distance to each of the beacons 4 based on the detected signal strengths and the determined signal levels, and localize the node 3 by means of the received location information and the calculated distances. It should be noted that the processing unit may comprise a plurality of sub-units which may be located in different parts of the node 3, able to communicate with each other.

FIG. 3 is a schematic flow chart of a specific method 10 of the present invention.

The node 3 receives (method step 11), by means of the receiver 5, location signals transmitted by each of at least three beacons 4, the location signals comprising information about the locations of the respective beacons, wherein the location signals from at least one of the beacons are transmitted by the beacon using dynamic transmission power whereby the beacon can consecutively transmit the location signals at a plurality of different predetermined signal levels.

When receiving the location signals, the node 3 also detects (step 12), by means of the detector 6, the respective received signal strengths of the received location signals, i.e. the received signal strength of the location signals transmitted by the at least one beacon 4 using dynamic transmission power is measured and thus detected, as well as the received signal strengths of the location signals transmitted by each of the other at least three beacons 4 each of which may use dynamic transmission power or use static transmission power.

The node 3 obtains (step 13) information about the different signal levels at which the beacons 4 can transmit. The node 3 stores the information by means of the storage unit 7. The power information may be obtained before, during or after any of the previous steps 11 and 12, as well as the step 14 below. The power information may e.g. comprise the real signal level(s) at which each of the beacons 4 transmit, or an index number or such which corresponds to the real signal level(s) at which each of the beacons 4 transmit. In the case of the at least one beacon 4, as well as any of the other beacons 4 using dynamic transmission power, the information covers the pre-set signal levels which it can use.

The node 3 studies (step 14) the received location signals. As discussed above, this studying may e.g. comprise, for each of the at least three beacons 4, obtaining information about the signal level a beacon 4 used for its transmission of its location signals comprised in the location signals (e.g. real transmission power, or index number corresponding to the real transmission power), or by studying the received signal strength over time from the beacon 4.

Based on the studying of step 14, the node 3, by means of the processing unit 8, determines (step 15) the signal levels used by each of the beacons for the transmission of the location signals. Again, these signal levels may be fixed signal levels (one for each beacon) for any beacons 4 using static transmission power, and one of a plurality of pre-set signal levels for each of the beacon(s) 4 using dynamic transmission power, such as APA.

Based on the detected signal strengths and the determined signal levels, the node 3 calculates (step 16), by means of the processing unit 8, a distance to each of the beacons 4, i.e. one distance to each beacon 4. This distance may be calculated due to the attenuation of the signals as they propagate the distance between the beacons 4 and the node 3.

Finally, the node 3 has the information needed to localize (step 17), by means of the processing unit 8, itself by using the received location information and the calculated distances. When the node 3 knows the location of each of the at least three beacons 4 and the distance to each of said beacons 4, said node may be localized. As discussed above, a weighted approach may be used.

In accordance with a specific aspect of the present invention it relates to a method for localizing a node in a wireless network, the method comprising: receiving location signals transmitted by beacons, the location signals comprising information about the locations of the respective beacons; detecting the respective received signal strengths of the received location signals; obtaining information about the different signal levels at which the beacons can transmit; studying the received location signals; determining the signal levels used by each of the beacons for the transmission of the location signals, based on the studying of the received signals; calculating a distance to each of the beacons based on the detected signal strengths and the determined signal levels; and localizing the node by means of the received location information and the calculated distances. The invention also relates to a node ant to a wireless network.

The invention has mainly been described above with reference to a few embodiments. However, as is readily appreciated by a person skilled in the art, other embodiments than the ones disclosed above are equally possible within the scope of the invention, as defined by the appended patent claims.

What is claimed:

1. A method in a node for localizing said node in a wireless network of an industrial plant, the method comprising:
   receiving location signals transmitted by each of at least three beacons, the location signals comprising information about the locations of the respective beacons, wherein the location signals from at least one of the beacons are transmitted by the beacon using dynamic transmission power whereby the beacon consecutively transmits the location signals at a plurality of different predetermined signal levels;
   sending a negative acknowledgement, NACK, to the at least one of the beacons in response to receiving the location signals from said beacon, thereby prompting the beacon to transmit at the plurality of signal levels;
   detecting the respective received signal strengths of the received location signals;
   obtaining information about the different signal levels at which the beacons transmit;
   studying the received location signals;
   determining the signal levels used by each of the beacons for the transmission of the location signals, based on the studying of the received signals;
   calculating a distance to each of the beacons based on the detected signal strengths and the determined signal levels; and
   localizing the node by means of the received location information and the calculated distances;
   wherein said studying the received location signals comprises monitoring the location signals over time during which time the at least one of the beacons transmits at a plurality of its signal levels, such that conclusions can be drawn about which of the signal levels of the at least one of the beacons corresponds to which received signal strength.

2. The method of claim 1, wherein said localizing comprises weighing the location information received from each of the beacons in accordance with the respective calculated distances to said beacons.

3. The method of claim 1, wherein the location signals further comprises power information about which of the signal levels is used by the at least one beacon for transmission of said location signals, and wherein the studying of the location signals comprises obtaining said power information.

4. The method of claim 1, wherein NACKs are sent in response to received location signals until location signals from the at least one of the beacons have been sent at a maximum signal level.

5. The method of claim 1, wherein the node is mounted to a human person.

6. A node for a wireless network, the node comprising:

a receiver adapted to receive location signals transmitted by each of at least three beacons, the location signals comprising information about the locations of the respective beacons, wherein the location signals are transmitted by at least one of the beacons using dynamic transmission power whereby the beacon consecutively transmits the location signals at a plurality of different predetermined signal levels;

a detector adapted to detect the respective received signal strengths of the received location signals;

a storage unit adapted to store information about the different signal levels at which the beacons transmit; and a processing unit adapted to send a negative acknowledgement, NACK, to the at least one of the beacons in response to receiving the location signals from said beacon, thereby prompting the beacon to transmit at the plurality of signal levels, study the received location signals, determine the signal levels used by each of the beacons for the transmission of the location signals, based on the study of the received signals, calculate a distance to each of the beacons based on the detected signal strengths and the determined signal levels, and localize the node by means of the received location information and the calculated distances;

wherein said studying of received location signals comprises monitoring the location signals over time during which time the at least one of the beacons transmits at a plurality of its signal levels, such that conclusions can be drawn about which of the signal levels of the at least one of the beacons corresponds to which received signal strength.

7. A wireless network of an industrial plant, the network comprising:

a node according to claim 6;

at least three beacons adapted to wirelessly transmit the location signals to the node, wherein at least one of the beacons is configured to use dynamic transmission power.

8. The method of claim 1, wherein the location signals from at least one of the beacons are transmitted by the beacon using adaptive power adjustment.

9. The method of claim 1, wherein the location signals from each of the beacons are transmitted using dynamic transmission power.

10. The method of claim 3, wherein the power information comprises the real signal level.

11. The node of claim 6, wherein said localizing of the node comprises weighing the location information received from each of the beacons in accordance with the respective calculated distances to said beacons.

12. The node of claim 6, wherein the location signals further comprises power information about which of the signal levels is used by the at least one of the beacons for transmission of said location signals, and wherein the studying of the location signals comprises obtaining said power information.

13. The node of claim 6, wherein NACKs are sent in response to received location signals until location signals from the at least one of the beacons have been sent at a maximum signal level.

14. The node of claim 6, wherein the node is mounted to a human person.

15. The node of claim 6, wherein the location signals from at least one of the beacons are transmitted by the beacon using adaptive power adjustment.

16. The node of claim 6, wherein the location signals from each of the beacons are transmitted using dynamic transmission power.

17. The node of claim 12, wherein the power information comprises the real signal level.

* * * * *